No. 783,820. PATENTED FEB. 28, 1905.
J. B. CLAYTON & R. D. O. JOHNSON.
ARTIFICIAL STONE MOLD.
APPLICATION FILED JUNE 27, 1904.
2 SHEETS—SHEET 2.
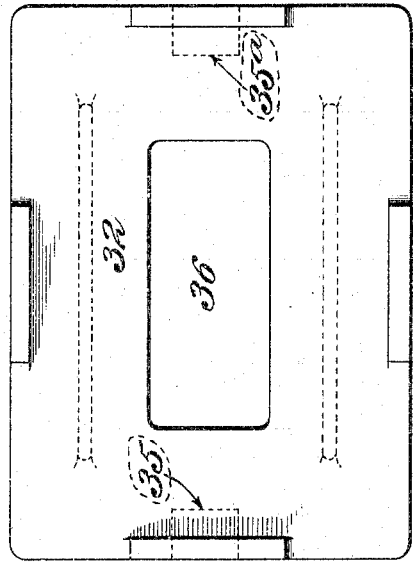
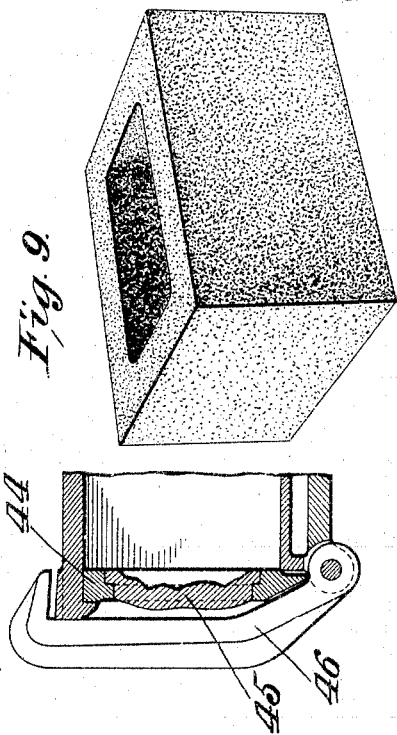
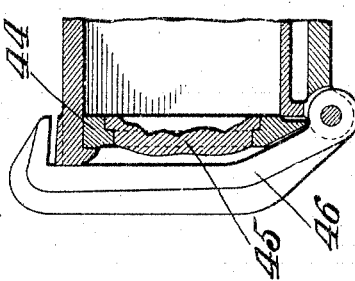
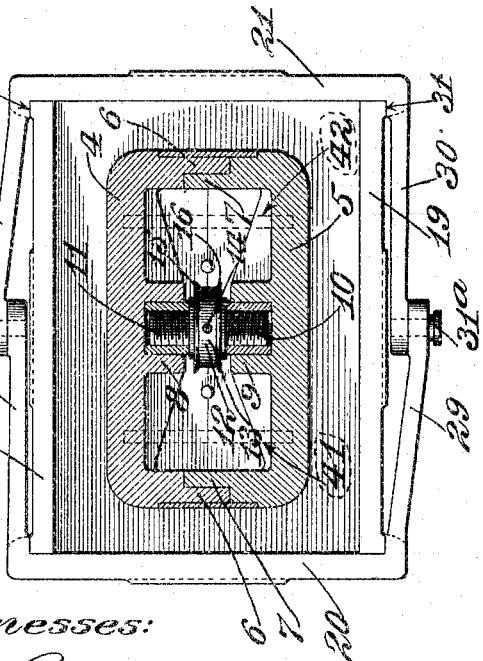
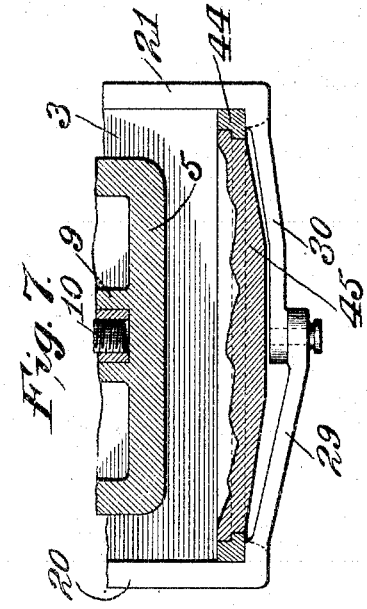
Witnesses:
G. W. Pennington
B. F. Funk
Inventors:
John B. Clayton,
Reno D. O. Johnson,
by Bakewell & Cornwall
Attys.

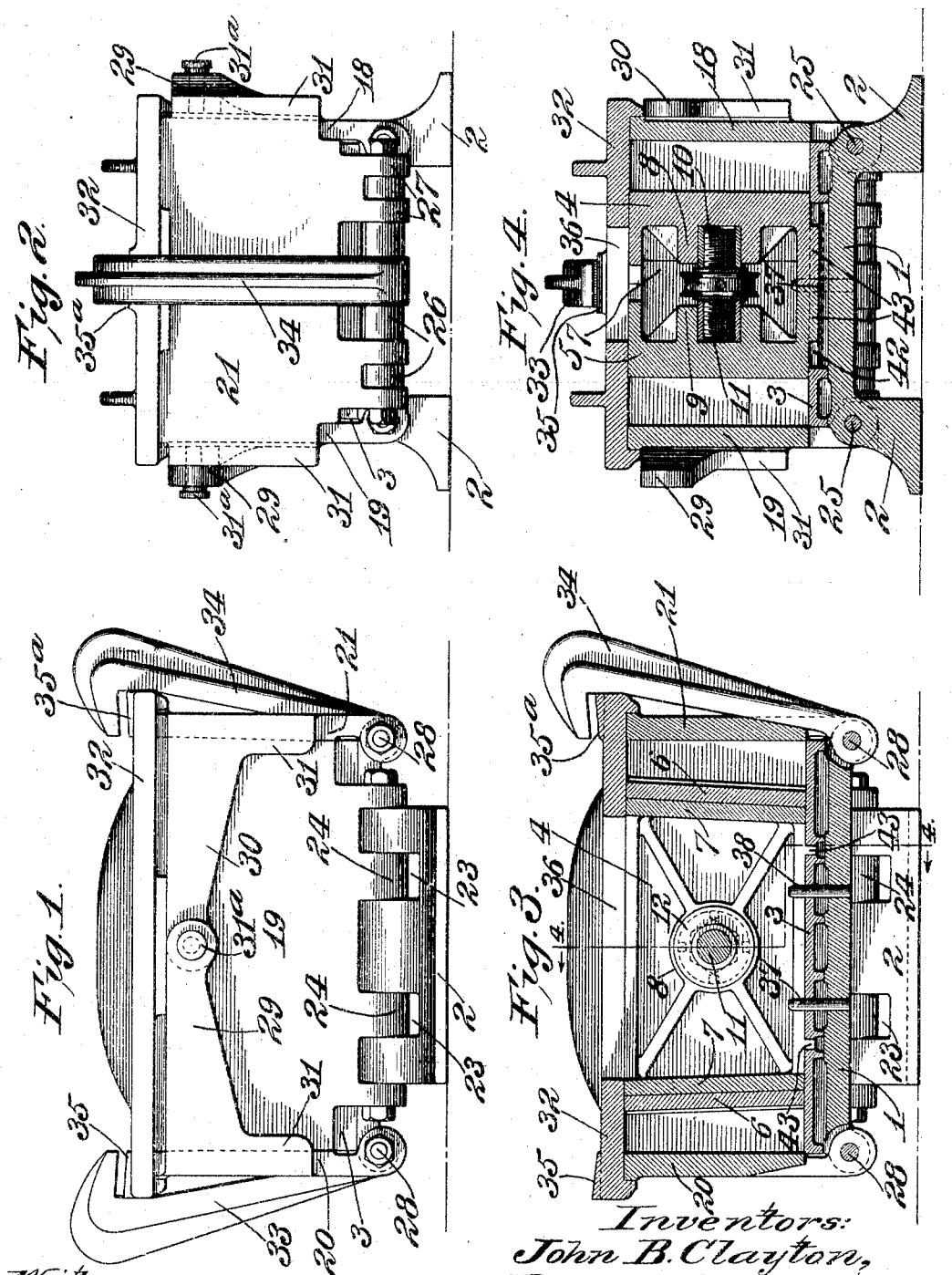

No. 783,820.

Patented February 28, 1905.

UNITED STATES PATENT OFFICE.

JOHN B. CLAYTON, OF KIRKWOOD, AND RENO D. O. JOHNSON, OF ST. LOUIS, MISSOURI.

ARTIFICIAL-STONE MOLD.

SPECIFICATION forming part of Letters Patent No. 783,820, dated February 28, 1905.

Application filed June 27, 1904. Serial No. 214,332.

*To all whom it may concern:*

Be it known that we, JOHN B. CLAYTON, residing at Kirkwood, and RENO D. O. JOHNSON, residing at St. Louis, Missouri, citizens of the United States, have jointly invented a certain new and useful Improvement in Artificial-Stone Molds, of which the following is a full, clear, and exact description, such as will enable others skilled in the art to which it appertains to make and use the same, reference being had to the accompanying drawings, forming part of this specification, in which—

Figure 1 is a side elevational view of a mold constructed in accordance with our invention. Fig. 2 is an end view of the mold. Fig. 3 is a vertical longitudinal sectional view through the mold. Fig. 4 is a transverse sectional view through the mold. Fig. 5 is a horizontal sectional view through the mold. Fig. 6 is an inverted plan view of the cover. Fig. 7 is a fragmentary sectional view of a slightly-modified form of mold. Fig. 8 is a fragmentary sectional view of one end of the modified form of mold, and Fig. 9 is a detail perspective view of the building-block.

This invention relates to a mold for forming artificial building-blocks.

The primary object is to provide a mold for forming building-blocks, which mold is so constructed that the compression of the block will be exerted against the interior walls instead of exteriorly, as at present practiced.

Another object of this invention is to provide means whereby an even pressure can be exerted.

Another object is to provide means whereby the block may be conveniently removed from the mold after the material of which it is composed has set.

A still further object of the invention is to provide means for conveniently locking the parts of the mold.

Another object is to provide an expansible and contractible core which is capable of compressing the block.

Other objects and advantages, as well as the novel details of construction, will be specifically described herinafter, it being understood that changes in the form, proportion, and minor details of construction may be resorted to without departing from the spirit and sacrificing any of the advantages thereof.

In the drawings illustrating the preferred embodiment of our invention, 1 designates a base supported upon the feet 2. A false or removable bottom 3 is supported upon the base and is designed to receive the block formed by the mold. A sectional molding-core is provided which consists of two expansible and contractible parts, (designated by the numerals 4 and 5, respectively.) These parts 4 and 5 have overlapping edges 6 and 7, and when the parts are in their contracted positions the core is approximately rectangular. The hollow inwardly-projecting bosses 8 and 9 are provided with internally-threaded nuts to receive the right and left threaded portions 10 and 11 of the adjusting member 12. An intermediate circular head 13 is provided for the adjusting member, which head is provided with peripherally-disposed recesses 14 for the reception of a suitable adjusting-tool, such as a spanner or similar implement. In order that the adjusting-tool may be guided into engagement with the recesses in the head, we have provided parallel flanges 15 and 16, which are circumferentially disposed on the head, the inner sides being beveled, whereby the tool will be guided into proper engagement with the recesses.

18 and 19 designate the sides of the mold and 20 and 21 the ends thereof. The sides of the mold are hinged to the base 1, suitable recesses 23 being provided in the base for the reception of the lugs 24, which lugs are pivotally secured to the base by the rods 25, which act as pintles for the hinged connections. Perforate lugs 26 are formed on the end of the base 1 for engagement with the bifurcated lugs 27 of the end walls, which have openings registering with those in the lugs 26, so that the pintle-bolts 28 may pass therethrough and form a suitable connection.

By hinging the sides and ends of the mold they can be easily folded out of engagement with the finished block, so that the block can be conveniently removed. A novel means is provided for locking the sides and ends against movement. The sides are held against movement by means of the overlapping arms 29 and 30, carried by the respective ends of the mold, the ends being formed with flanges 31, which overlap the edges of the sides. The overlapping arms 29 and 30 are provided with alining perforations for the reception of a fastening device 31ª, which may be suitably inserted therein to prevent accidental displacement of the sides when the mold is being filled.

A top 32 is formed with depending flanges which fit over the edges of the ends, said top being held against upward displacement by means of swinging securing devices, illustrated as hooks 33 and 34. These hooks are hinged on the pintles, which carry the respective ends of the mold, and when they are swung into locking position suitable wedges can be inserted between the hooks and the cam-faces 35 and 35ª of the top. It will be observed that the top is provided with an elongated centrally-disposed slot 36, the edges of the slot overlapping the core, so that the matrix of the mold will be entirely inclosed. The purpose of providing the elongated slot 36 in the top or cover of the mold is to provide means whereby the tool may be inserted for actuating the core-expander. In order that the best results may be obtained, it is desirable that the core remain centered with respect to the mold. The centering devices are illustrated as pins 37 and 38, which project through openings in the false bottom and in the core. Slots 41 and 42 are formed in the bottom 3, which slots are designed for the purpose of receiving ribs 43 on the core-sections, so that the mold-sections will be properly held in place and guided.

In utilizing the mold the core is first properly centered in the flask and the material of which the finished block is to be composed is flowed in the matrix in a plastic or semiplastic condition. The top is then placed upon the flask and secured against movement by the hooks. The tool is then inserted through the slot in the top, and the expander is manipulated, whereby an internal compression is exerted in the mold and against the material, the sides, and ends of the flask.

The principal advantage accruing from the manipulation of the core so that an internal pressure will be exerted is that the exterior of all of the blocks made will be uniform. It is obvious that if an external pressure be exerted upon the block this uniformity in size cannot be provided. Of course it is obvious that as soon as the block has sufficiently set it can be removed and allowed to season. It is also obvious that these blocks can be formed with various configurations upon the exterior surfaces and that any design may be impressed or molded upon the face or faces of the block to suit the demands of the trade. In the modified form illustrated in Figs. 7 and 8 we have illustrated means whereby a suitable design may be molded in imitation of rough rock or other similar design. This can be accomplished by making one or both sides in the form of a frame 44, having a rabbeted edge to receive a removable molding-die 45. Where it is desired to configure the face or faces of the block, a frame of standard size will be employed, and interchangeable dies will be used for coöperation with said frame, so that it will only be necessary to substitute one die for another to change the design on the face of the block. Where the removable dies are used, the fastening devices or hooks will usually be of a peculiar design, the body portions being inclined in an outward direction, as at 46, whereby the bodies of the hooks may be spaced away from the mold to give ample room for the insertion of the dies.

Having thus described the invention, what is claimed as new, and desired to be secured by Letters Patent, is—

1. A molding-core comprising two sections movable away from and toward each other, alining bosses carried by the sections and provided with interior threads, an expanding member having exterior threads engaging the threads in the bosses, and a flanged head carried by the expanding member and forming a part thereof, the flanges of the head comprising guides for guiding an expanding tool into engagement with said head; substantially as described.

2. A mold for building-blocks having hinged sides and ends, the ends having arms with alining openings and fastening devices for engagement with said openings; substantially as described.

3. A mold for building-blocks having a slotted false bottom, pins projecting through said false bottom to retain it rigid with relation to the remainder of the mold and a sectional expansible core having projections in the slots of the false bottom whereby said sections are guided by said slotted bottom; substantially as described.

4. A mold for building-blocks having a removable false bottom to support the block after it leaves the mold, said bottom being provided with slots therein, and a sectional and expansible core, the sections of which are provided with projections guided in said slots; substantially as described.

5. A mold for hollow building-blocks comprising a base, hinged sides and ends carried by the base, the ends being provided with arms having alining openings, fastening devices for engagement with the openings, and a removable cover having flanges overlapping the edges of the hinged sides and ends; substantially as described.

6. A mold for hollow building-blocks comprising a base, hinged sides and ends carried by the base, a top or cover fitting over the sides and ends, and pivoted hook fastening devices having their terminals extending over the top of the cover; substantially as described.

7. A mold for hollow building-blocks including a cover having a slot therein, an expansible core within the mold and having a slot in alinement with the slot in the cover, and an expansible device entirely within the core and mold and alining with the above-named slots, said expanding device being accessible through said slots; substantially as described.

8. In a mold, the combination with a base, sides and ends, flanges on the ends and overlapping the sides, arms projecting from the flanges and projecting toward each other, and fastening devices connecting the ends of the arms; substantially as described.

9. A mold having a base, sides and ends, a removable cover for the mold and fitting over the sides and ends, cam-faces on the cover, hinged hooks having their ends movable to positions over the cam-faces, and wedges insertible between the ends of the hooks and the cam-faces; substantially as described.

10. A mold for hollow building-blocks including a base, hinged sides and ends carried by the base, arms carried by the ends and having alining openings, fastening devices for the alining openings, a cover, and hinged hooks at the ends of the mold and adapted for engagement with the cover to hold it in place; substantially as described.

In testimony whereof we hereunto affix our signatures, in the presence of two witnesses, this 21st day of June, 1904.

JOHN B. CLAYTON.
    RENO D. O. JOHNSON.

Witnesses:
 B. F. Funk,
 George Bakewell.